(12) United States Patent  
Zhang (10) Patent No.: US 10,461,806 B2  
(45) Date of Patent: Oct. 29, 2019

(54) METHOD FOR MEASURING INTERFERENCE TO CM, APPARATUS, AND SYSTEM

(71) Applicant: HUAWEI TECHNOLOGIES CO., LTD., Shenzhen, Guangdong (CN)

(72) Inventor: Li Zhang, Wuhan (CN)

(73) Assignee: Hauwei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/274,943

(22) Filed: Feb. 13, 2019

(65) Prior Publication Data

US 2019/0181912 A1 Jun. 13, 2019

Related U.S. Application Data

(63) Continuation of application No. PCT/CN2016/095286, filed on Aug. 15, 2016.

(51) Int. Cl.
| | |
|---|---|
| *H04B 1/38* | (2015.01) |
| *H04B 3/48* | (2015.01) |
| *H04L 12/28* | (2006.01) |

(52) U.S. Cl.  
CPC ........... *H04B 3/48* (2013.01); *H04L 12/2801* (2013.01)

(58) Field of Classification Search  
CPC ... H04L 12/2801; H04L 1/004; H04L 5/1438; H04B 3/48

(Continued)

(56) References Cited

U.S. PATENT DOCUMENTS

2014/0022943 A1 1/2014 Ling et al.  
2016/0028496 A1 1/2016 Currivan et al.  
(Continued)

FOREIGN PATENT DOCUMENTS

| CN | 105306250 A | 2/2016 |
|---|---|---|
| CN | 105704823 A | 6/2016 |

(Continued)

OTHER PUBLICATIONS

ESTI EN 302 878-4 v1.11 (Nov. 2011), Access, Terminals, Transmission and Multiplexing (ATTM); Third Generation Transmission Systems for Interactive Cable Television Services—IP Cable Modems; Part 4: MAC and Upper Layer Protocols;DOCSIS 3.0, Nov. 2011, 648 pages.

(Continued)

*Primary Examiner* — Zewdu A Kassa  
(74) *Attorney, Agent, or Firm* — Fish & Richardson P.C.

(57) ABSTRACT

The present disclosure provides, for example, methods for measuring interference to a cable modem (CM), and corresponding example apparatuses and systems. One example method includes sending, by a cable modem termination system (CMTS), a broadcast message to all CMs connected to the CMTS, where the broadcast message includes information designating one of the CMs to send a probing signal by using a spectrum S in a timeslot T. The CMTS can then broadcast a pseudo random binary sequence (PRBS) by using the spectrum S in a downlink direction in the timeslot T, and can obtaining modulation error ratio (MER) information recorded in the timeslot T by other CMs. A difference between MER information in the timeslot T and MER information in a normal data timeslot can be used, for each of the other CMs, as intensity of interference to the corresponding CM.

14 Claims, 3 Drawing Sheets

(58) Field of Classification Search
USPC .................. 375/222, 219, 220, 316, 295
See application file for complete search history.

(56) References Cited

U.S. PATENT DOCUMENTS

| | | |
|---|---|---|
| 2017/0019242 A1* | 1/2017 | Jin .................. H04L 5/1461 |
| 2017/0279488 A1 | 9/2017 | Wang et al. |
| 2018/0041970 A1 | 2/2018 | Emmanuel et al. |
| 2019/0007097 A1 | 1/2019 | Tu |

FOREIGN PATENT DOCUMENTS

| | | |
|---|---|---|
| EP | 2938095 A1 | 10/2015 |
| WO | 2015127624 A1 | 9/2015 |
| WO | 2016090591 A1 | 6/2016 |

OTHER PUBLICATIONS

CableLabs, "Data-Over-Cable Service Interface Specifications DOCSIS® 3.1," Physical Layer Specification, CM-SP-PHYv3.1-I07-150910, Sep. 10, 2015, 244 pages.
Extended European Search Report issued in European Application No. 16913006.9 dated Mar. 28, 2019, 7 pages.
PCT International Search Report and Written Opinion issued in International Application No. PCT/CN2016/095286 dated Mar. 28, 2017, 17 pages (with English translation).

* cited by examiner

METHOD FOR MEASURING INTERFERENCE TO CM, APPARATUS, AND SYSTEM

CROSS-REFERENCE TO RELATED APPLICATIONS

This application is a continuation of International Application No. PCT/CN2016/095286, filed on Aug. 15, 2016, the disclosure of which is hereby incorporated by reference in its entirety.

TECHNICAL FIELD

The present invention relates to the communications field, and in particular, to a method for measuring interference to a cable modem (CM), an apparatus, and a system.

BACKGROUND

The communications field is mainly related to time division duplex (TDD), frequency division duplex (FDD), and co-time co-frequency full duplex (CCFD).

In a current CCFD solution, CCFD is implemented only on a CMTS side, and on a CM side, all CMs may be grouped based on an interference relationship (also referred to as isolation) between the CMs. Specifically, CMs that interfere with each other or have mutual interference that does not meet a requirement are grouped into a group to implement FDD within a CM group, and CMs that do not interfere with each other or have mutual interference that meets a requirement are grouped into different groups. CCFD is implemented between groups to improve spectral efficiency.

It may be learned from the foregoing that CM grouping is mainly implemented based on an interference relationship between CMs. In other words, the interference relationship between CMs can determine CM grouping. How to obtain an accurate interference relationship between CMs is always an issue studied in the industry.

SUMMARY

According to a method for measuring interference to a cable modem, an apparatus, and a system provided in the present invention, a more accurate interference relationship between CMs can be obtained.

According to a first aspect, the present invention provides a method for measuring interference to a cable modem CM, including:

sending, by a cable modem termination system CMTS, a broadcast message to notify all CMs connected to the CMTS, where the broadcast message instructs one of the CMs to send a probing signal by using a spectrum S in a timeslot T, and the spectrum S is one of overlapping parts between uplink and downlink spectrums;

in the timeslot T when the designated CM sends a probing signal by using the spectrum S in the timeslot T, broadcasting, by the CMTS, a pseudo random binary sequence by using the spectrum S in a downlink direction; and obtaining, by the CMTS, modulation error ratio MER information recorded in the timeslot T by other CMs, and using a difference between MER information in the timeslot T and MER information in a normal data timeslot, of each of the other CMs, as intensity of interference to the corresponding CM, where the other CMs are CMs remaining after the designated CM is removed from all the CMs connected to the CMTS, and the normal data timeslot is a timeslot in which the CMTS sends service data in the downlink direction.

In a possible design, the method further includes: grouping, by the CMTS based on the obtained intensity of interference to each of the other CMs, a CM undergoing interference whose intensity is higher than a threshold and the designated CM into a group.

According to a second aspect, an embodiment of the present invention provides a method for measuring interference to a cable modem CM, including:

sending, by a cable modem termination system CMTS, a broadcast message to ungrouped cable modems CMs, where the broadcast message instructs one of the ungrouped CMs to send a probing signal by using a spectrum S' in a timeslot T', and the spectrum S' is one of overlapping parts between uplink and downlink spectrums;

in the timeslot T' when the designated CM sends a probing signal by using the spectrum S', broadcasting, by the CMTS, a pseudo random binary sequence by using the spectrum S' in a downlink direction; and obtaining, by the CMTS, modulation error ratio MER information recorded in the timeslot T' by non-designated CMs in the ungrouped CMs, and using a difference between MER information in the timeslot T' and MER information in a normal data timeslot, of each of the other CMs, as intensity of interference to the corresponding CM, where the other CMs are CMs remaining after the designated CM is removed from the ungrouped CMs, and the normal data timeslot is a timeslot in which the CMTS sends service data in the downlink direction.

In a possible design, the method further includes: sending, by the designated CM, a probing signal by using the designated spectrum S' in an uplink direction in the timeslot T'.

In a possible design, the method further includes: grouping, by the CMTS based on the obtained intensity of interference to each of the other CMs, a CM undergoing interference whose intensity is higher than a threshold and the designated CM into a group.

In a possible design, the CMTS determines, based on configuration information of each CM, whether the CM belongs to the ungrouped CMs.

According to a third aspect, an embodiment of the present invention provides a cable modem termination system CMTS, including a sending module, a processing module, and a receiving module, where the sending module is configured to send a broadcast message to ungrouped cable modems CMs, where the broadcast message instructs one of the ungrouped CMs to send a probing signal by using a spectrum S' in a timeslot T', where the spectrum S' is one of overlapping parts between uplink and downlink spectrums; and is further configured to broadcast a pseudo random binary sequence by using the spectrum S' in a downlink direction in the timeslot T';

the receiving module is configured to receive modulation error ratio MER information recorded in the timeslot T' by other CMs; and the processing module is configured to use, based on the MER information recorded in the timeslot T' by the other CMs and obtained by the receiving module, a difference between MER information in the timeslot T' and MER information in a normal data timeslot, of each of the other CMs, as intensity of interference to the corresponding CM, where the other CMs are CMs remaining after the designated CM is removed from the ungrouped CMs, and the normal data timeslot is a timeslot in which the CMTS sends service data in the downlink direction.

In a possible design, the CMTS further includes a grouping module, configured to group, based on the intensity, obtained by the processing module, of interference to each of the other CMs, a CM undergoing interference whose intensity is higher than a threshold and the designated CM into a group.

In a possible design, the processing module is further configured to determine, based on configuration information of each CM, whether the CM belongs to the ungrouped CMs.

According to a fourth aspect, the present invention further provides a cable modem CM, including a sending module, a receiving module, and a recording module, where the receiving module is configured to receive a broadcast message sent by a CMTS, where the broadcast message includes information designating the CM to send a probing signal by using a spectrum S in a timeslot T, and the spectrum S is one of overlapping parts between uplink and downlink spectrums; and is further configured to receive, by using the designated spectrum S in the designated timeslot T, a pseudo random binary sequence PRBS sent by the CMTS;

the sending module is configured to send a probing signal by using the designated spectrum S in the designated timeslot T based on the broadcast message received by the receiving module; and the recording module is configured to: record a local MER when a probing signal is sent by using the designated spectrum S in the designated timeslot T, and record a local MER in a normal data timeslot.

In a possible design, the sending module is further configured to send the MER information recorded by the recording module to the CMTS. Alternatively, the sending module sends a difference between the MER information in the timeslot T and the MER information in the normal data timeslot to the CMTS.

According to a fifth aspect, the present invention further provides a cable communications system, including the foregoing cable modem termination system CMTS and the plurality of cable modems CMs.

According to the solutions of the embodiments, one designated CM is required to send a probing signal by using a designated spectrum in an uplink direction in a particular timeslot, and at the same time, the CMTS broadcasts a PRBS by using the designated spectrum in a downlink direction. This is equivalent to construction of a test environment. A difference between an MER in the test environment and an MER in a normal service data receiving and sending environment of each CM reflects intensity of interference to each CM. In the constructed test environment, the CMTS also sends a signal. In this way, measured intensity of interference to the CM is more accurate.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For ease of understanding, first, an example diagram of an overall system architecture of a cable communications system that can implement a method of the embodiments of the present invention is first described. It should be understood that the embodiments of the present invention are not limited to a system architecture shown in FIG. 1. In addition, an apparatus in FIG. 1 may be hardware, or may be software divided based on a function, or a structure of both software and hardware.

Figure 1:
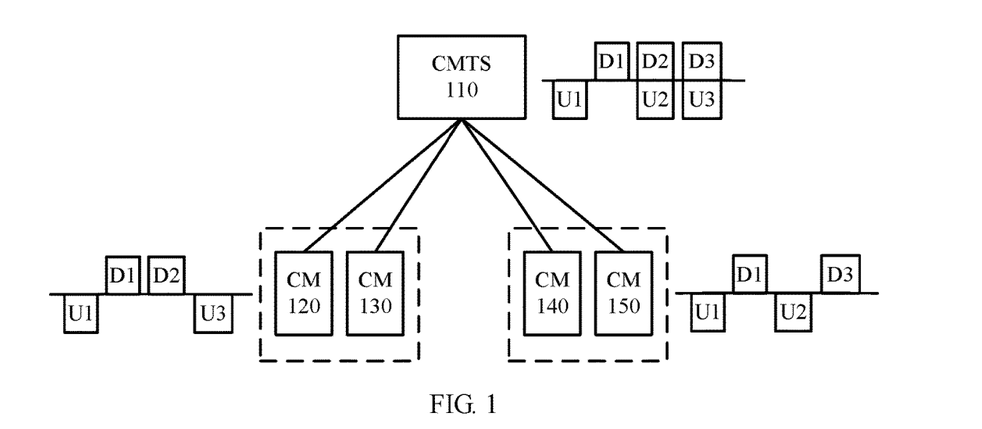
FIG. 1 is a schematic architectural diagram of a communications system according to an embodiment of the present invention.

The system shown in FIG. 1 includes a cable modem termination system (CMTS) 110, a CM 120, a CM 130, a CM 140, and a CM 150. It should be noted that the CMTS and a quantity of CMs in FIG. 1 shall not be construed as a limitation on the present invention. The CMTS 110, the CM 120, the CM 130, the CM 140, and the CM 150 may comply with the conventional Data Over Cable Service Interface Specifications (DOCSIS) 3.1. A signal transmission direction from the CMTS to the CM is referred to as a downlink direction, and a signal transmission direction from the CM to the CMTS is referred to as an uplink direction.

The CMTS is a device that manages and controls CMs, and can be configured by using a console interface or an Ethernet interface. Configuration content of the CMTS mainly includes a downlink frequency, a downlink modulation scheme, a downlink level, and the like. The downlink frequency can be set to any value within a designated frequency range. To avoid interference with a signal of another channel, the downlink frequency needs to be selected from specified frequencies with reference to a cable television channel division table. A modulation scheme should be selected in consideration of channel transmission quality. In addition, Internet Protocol (IP) addresses of Dynamic Host Configuration Protocol DHCP) and Trivial File Transfer Protocol (TFTP) servers, an IP address of the CMTS, and the like need to be set. After the foregoing setting is completed, if an intermediate line is not faulty and attenuation of a signal level meets a requirement, the DHCP and TFTP servers are started. In this way, a normal communication channel can be established between a front end and the CM.

The CM is a device that is on a cable television network (namely, a cable network) and that is used to connect to the Internet. The CM is connected in series between a cable television cable socket in a user's home and an Internet access device. The other end connected to the CM by using the cable television network is on a cable television station, and the other end may be referred to as a front end or a head end.

A working mode of the CMTS 110 is CCFD. As shown in FIG. 1, the CMTS 110 may separately use channels occupying a D1 spectrum, a D2 spectrum, and a D3 spectrum to send downlink signals, and may also receive uplink signals sent by using channels occupying a U1 spectrum, a U2 spectrum, and a U3 spectrum. The D2 spectrum overlaps the U2 spectrum, and the D3 spectrum overlaps the U3 spectrum. The CMTS may send signals with same or different power to all CMs, and the CMTS may receive signals with same or different power that are sent by the CMs.

The CM 120, the CM 130, the CM 140, and the CM 150 keep uplink and downlink frequency division duplex FDD. The CM 120, the CM 130, the CM 140, and the CM 150 need to be grouped based on a degree of interference (which may also be referred to as interference severity or mutual isolation). For example, the CM 120 and the CM 130 are in a same group, the CM 120 and the CM 130 may use channels occupying the U1 spectrum and the U3 spectrum to send uplink signals, and may receive downlink signals sent by using channels occupying the D1 spectrum and the D2 spectrum. The U1 spectrum, the U3 spectrum, the D1 spectrum, and the D2 spectrum do not overlap each other.

The CM 140 and the CM 150 are in a same group, the CM 140 and the CM 150 may use channels occupying the U1 spectrum and the U2 spectrum to send uplink signals, and may receive downlink signals sent by using channels occupying the D1 spectrum and the D3 spectrum. The U1 spectrum, the U2 spectrum, the D1 spectrum, and the D3 spectrum do not overlap each other.

In this embodiment of the present invention, a degree of interference between any two CMs, for example, two of M CMs connected to the CMTS, may be represented by $CM_{i,j}$. Specifically, $CM_{i,j}$ indicates a degree of interference of a signal sent by a $j^{th}$ CM to a signal received by an $i^{th}$ CM in the M CMs.

In addition, a current relatively common solution for testing an interference degree is as follows: First, a CMTS allocates an uplink/downlink silent timeslot. In the silent timeslot, only one designated CM sends a probing signal, and other CMs can only receive signals but cannot send signals. In addition, the CMTS stops sending a downlink signal in the silent timeslot, to avoid interference to the probing signal sent by the designated CM. The other CMs obtain an interference degree by calculating a difference between power of a received probing signal and power of the probing signal sent by the designated CM.

However, in this test solution, all of the M CMs need to be designated in turn to repeat the foregoing process. M operations need to be performed to obtain an interference table of an entire network, and this takes a relatively long time. In addition, during the foregoing test process, the CMTS needs to suspend sending of a downlink signal. This belongs to lossy measurement.

Figure 2:
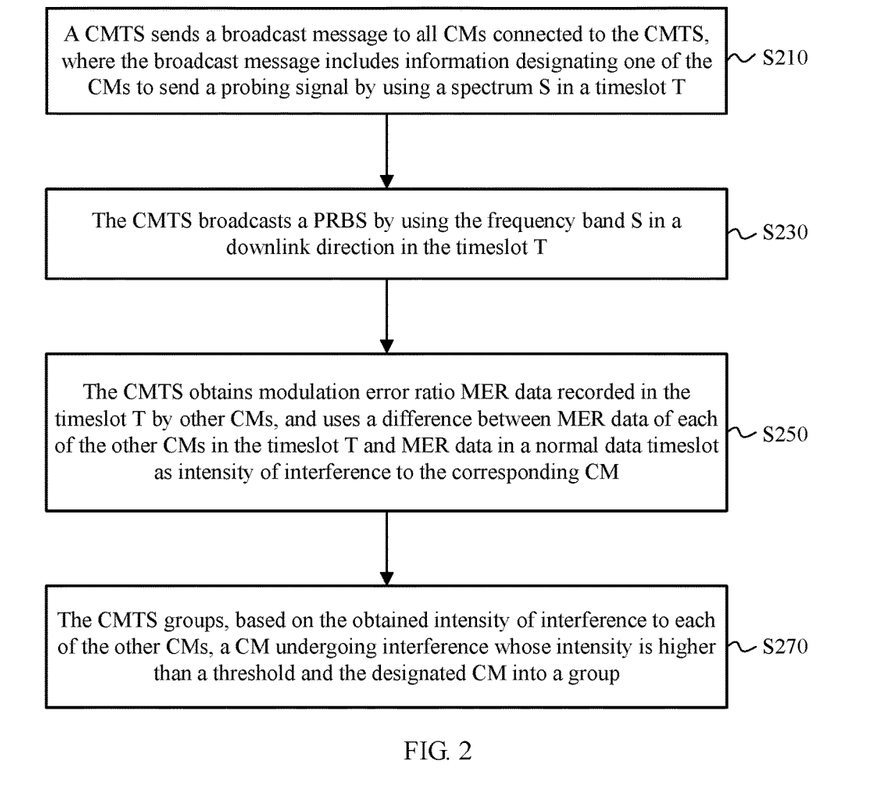
FIG. 2 is a schematic flowchart of a method for measuring an interference degree according to an embodiment of the present invention.

FIG. 2 is a schematic flowchart of a method for measuring an interference degree according to an embodiment of the present invention. It should be understood that FIG. 2 shows steps or operations of the method, but these steps or operations are merely examples. In this embodiment of the present invention, another operation may be performed or a variant of each operation in FIG. 2 may be performed. In addition, the steps in FIG. 2 may be performed in a sequence different from that shown in FIG. 2, and not all operations in FIG. 2 need to be performed.

S210. A CMTS sends a broadcast message to all CMs connected to the CMTS, where the broadcast message includes information designating one of the CMs to send a probing signal by using a spectrum S in a timeslot T, and the spectrum S is one of overlapping parts between uplink and downlink spectrums.

The broadcast message may be in a format of a P-MAP message in the DOCSIS 3.1 standard, or may be in another message format, provided that the broadcast message includes information designating one of the CMs to send a probing signal by using the spectrum S in the timeslot T.

S230. The CMTS broadcasts a pseudo random binary sequence (PRBS) by using the spectrum S in a downlink direction in the timeslot T.

Specifically, after receiving the broadcast message sent by the CMTS, the designated CM sends a probing signal based on indication content by using the designated spectrum S in an uplink direction in the timeslot T. At the same time, the CMTS sends the PRBS by using the spectrum S in the downlink direction. It should be noted that the PRBS is a known pseudo-random sequence and is not a service data signal.

Usually, power of the probing signal sent by the designated CM needs to be lower, for example, 20 to 30 dB lower, than power of a sent uplink service data signal, to reduce interference to downlink signals of other CMs.

S250. The CMTS obtains modulation error ratio (MER) information recorded in the timeslot T by other CMs, and uses a difference between MER information in the timeslot T and MER information in a normal data timeslot, of each of the other CMs, as intensity of interference to the corresponding CM, where the normal data timeslot is a timeslot in which the CMTS sends service data in the downlink direction.

The MER information is a logarithmic measurement result of signal distortion, and is similar to a signal-to-noise ratio or a carrier-to-noise ratio of an analogue system. The obtained MER information recorded in the timeslot T by the other CMs can reflect a signal distortion status of each CM in a test environment. The test environment is that the designated CM sends a probing signal by using the designated spectrum S in the uplink direction, and the CMTS broadcasts a PRBS by using the spectrum S in the downlink direction. MER information of each CM in the normal data timeslot can reflect a signal distortion status in a normal service data receiving and sending environments. Intensity of interference to each CM can be learned of by using an MER difference between the foregoing two environments of each of the other CMs.

The other CMs are CMs remaining after the designated CM is removed from all the CMs connected to the CMTS, namely, non-designated CMs.

Alternatively, in an embodiment, the CMTS that "obtains MER information recorded in the timeslot T by other CMs, and uses a difference between MER information of each CM in the timeslot T and MER information in a normal data timeslot as intensity of interference to the corresponding CM" in step S250 may be replaced with another management device or management module, provided that the another management device or management module can exchange information with the CM, obtain the MER information recorded in the timeslot T by each CM, and complete comparison and computation of the MER information of each CM in the timeslot T and the MER information in the normal data timeslot. This does not affect an implementation effect of this solution.

Further, in an embodiment, before step S250, the method further includes S240 (not shown in the figure): After receiving the broadcast message sent by the CMTS, the other CMs record MERs when sending probing signals by using the designated spectrum S in the designated timeslot T.

Furthermore, in an embodiment, the method further includes S270: The CMTS groups, based on the obtained intensity of interference to each of the other CMs, a CM undergoing interference whose intensity is higher than a threshold and the designated CM into a group. The threshold is preset, and a specific value may be set according to an actual precision requirement and an empirical value.

Optionally, in an embodiment, the CMTS may further perform classification to obtain two spectrums: an uplink dedicated (US Only) spectrum and a downlink dedicated (DS Only) spectrum. In an initialization phase, the CM obtains information about an uplink/downlink physical channel by using a channel corresponding to the DS only spectrum, and the information includes one or more items of information such as a channel type (DOCSIS3.0 or DOCSIS3.1), a channel identifier (ID), and a channel center frequency or a channel bandwidth. After being powered on, the CM completes ranging or registration by using a channel corresponding to the US Only spectrum. The uplink dedicated spectrum and the downlink dedicated spectrum that are obtained through classification do not overlap. In addition, the CMTS may determine, based on historical configuration information, whether the CM has been grouped.

It should be noted that the foregoing procedure is described starting from a scenario in which no CM has been grouped. In a scenario in which some CMs have been grouped, in comparison with the foregoing method, a test range is limited to ungrouped CMs, and other processes or requirements are basically consistent with those described above. Details are as follows:

The CMTS may send a broadcast message to the ungrouped CMs, where the broadcast message includes information designating one of the ungrouped CMs to send a probing signal by using a spectrum S' in a timeslot T', and the spectrum S' is one of overlapping parts between uplink and downlink spectrums. The designated CM sends a probing signal by using the designated spectrum S' in an uplink direction in the timeslot T'. The CMTS sends a PRBS by using the spectrum S' in the downlink direction. The CMTS obtains MER information recorded in the timeslot T' by non-designated CMs in the ungrouped CMs, and uses a difference between MER information in the timeslot T' and MER information in a normal data timeslot, of each of the other CMs, as intensity of interference to the corresponding CM. Then, the CMTS groups CMs based on the obtained interference intensity.

Different CMs and different spectrums on which the CMs send probing signals are designated, and the foregoing process is repeated until all CMs are grouped. During specific implementation, all CMs may be grouped into a grouped set and an ungrouped set, and the foregoing grouping process is repeated in the ungrouped set. After being grouped, a CM is removed from the ungrouped set, until the ungrouped set is empty.

According to the solution of this embodiment, one designated CM is required to send a probing signal by using a designated spectrum in an uplink direction in a particular timeslot, and at the same time, the CMTS broadcasts a PRBS by using the designated spectrum in a downlink direction, to construct a test environment. A difference between an MER of each CM in the test environment and an MER in a normal service data receiving and sending environment reflects intensity of interference to each CM. In the constructed test environment, the CMTS also sends a signal, and this is nearer an actual normal service data receiving and sending environment. In this way, measured intensity of interference to the CM is more accurate. In addition, CM grouping can be fast completed directly based on a magnitude relationship between the interference and the threshold.

It should be noted that in this embodiment, the difference between the MER information of each CM in the non-designated CMs in the timeslot T and the MER information in the normal data timeslot is used as the intensity of interference to the corresponding CM, that is, the MER information in the normal data timeslot is used as a reference value. A person of ordinary skill in the art should understand that a simple variant of the normal data timeslot should also be construed as an embodiment of the present invention, for example, there is no limitation that the normal data timeslot is a timeslot in which the CMTS sends service data in the downlink direction, but is a timeslot in which specific data similar to service data is sent.

Figure 3:
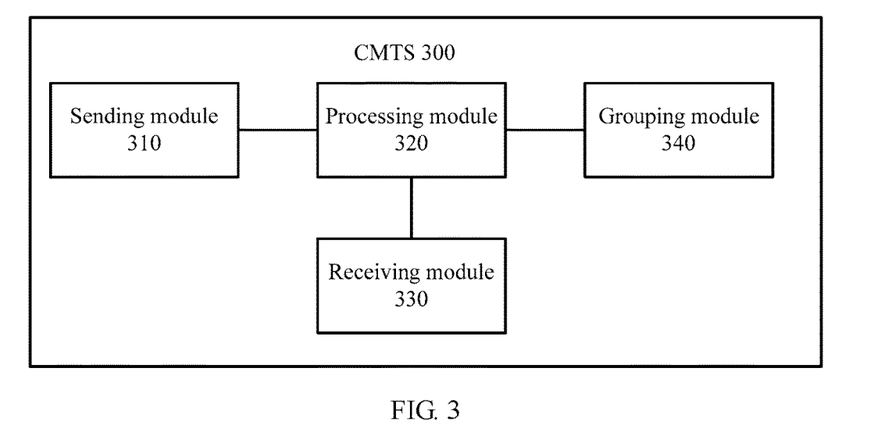
FIG. 3 is a schematic structural diagram of a CMTS according to an embodiment of the present invention.

An embodiment of the present invention provides a CMTS. As shown in FIG. 3, the CMTS 300 includes a sending module 310, a processing module 320, and a receiving module 330.

The sending module 310 is configured to send a broadcast message to all CMs connected to the CMTS, where the broadcast message includes information designating one of the CMs to send a probing signal by using a spectrum S in a timeslot T, and the spectrum S is one of overlapping parts between uplink and downlink spectrums; and is further configured to broadcast a pseudo random binary sequence PRBS by using the spectrum S in a downlink direction in the timeslot T.

The receiving module 330 is configured to receive modulation error ratio (MER) information recorded in the timeslot T by other CMs.

The processing module 320 is configured to use, based on the modulation error ratio MER information recorded in the timeslot T by the other CMs and obtained by the receiving module 330, a difference between MER information in the timeslot T and MER information in a normal data timeslot, of each of the other CMs, as intensity of interference to the corresponding CM.

The other CMs are CMs remaining after the designated CM is removed from the ungrouped CMs, namely, non-designated CMs. The normal data timeslot is a timeslot in which the CMTS sends service data in the downlink direction.

Further, in an embodiment, the CMTS 300 further includes a grouping module 340, configured to group, based on the intensity, obtained by the processing module, of interference to each of the other CMs, a CM undergoing interference whose intensity is higher than a threshold and the designated CM into a group.

The processing module 320 may be a processor or a controller, or may be a general-purpose processor, a digital signal processor (DSP), an application-specific integrated circuit (ASIC), a field programmable gate array FPGA) or another programmable logic device, a transistor logic device, a hardware component, or any combination thereof. The processing module may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The receiving module 330 and the sending module 310 may be a receiving interface part and a sending interface part in a transceiver respectively, or may be a receiving interface part and a sending interface part in a transceiver circuit respectively.

According to the solution of this embodiment, one designated CM is required to send a probing signal by using a designated spectrum in an uplink direction in a particular timeslot, and at the same time, the CMTS broadcasts a PRBS by using the designated spectrum in a downlink direction, to construct a test environment. A difference between an MER of each CM in the test environment and an MER in a normal service data receiving and sending environment reflects intensity of interference to each CM. In the constructed test environment, the CMTS also sends a signal. In this way, measured intensity of interference to the CM is more accurate. In addition, CM grouping can be fast completed directly based on a magnitude relationship between the interference and the threshold.

Another embodiment of the present invention provides another CMTS. The CMTS has a schematic structural diagram the same as that shown in FIG. 3, and also includes a sending module 310, a processing module 320, and a receiving module 330.

The sending module 310 is configured to send a broadcast message to ungrouped CMs, where the broadcast message includes information designating one of the ungrouped CMs to send a probing signal by using a spectrum S' in a timeslot T', where the spectrum S' is one of overlapping parts between uplink and downlink spectrums; and is further configured to broadcast a pseudo random binary sequence PRBS by using the spectrum S' in a downlink direction in the timeslot T'.

The receiving module 330 is configured to receive modulation error ratio MER information recorded in the timeslot T' by other CMs.

The processing module 320 is configured to use, based on the MER information recorded in the timeslot T' by the other CMs and obtained by the receiving module 330, a difference between MER information in the timeslot T' and MER information in a normal data timeslot, of each of the other CMs, as intensity of interference to the corresponding CM.

The other CMs are CMs remaining after the designated CM is removed from the ungrouped CMs, and the normal data timeslot is a timeslot in which the CMTS sends service data in the downlink direction.

Further, in an embodiment, the CMTS 300 further includes a grouping module 340, configured to group, based on the intensity, obtained by the processing module, of interference to each of the other CMs, a CM undergoing interference whose intensity is higher than a threshold and the designated CM into a group.

The processing module 320 may be further configured to determine, based on configuration information of each CM connected to the CMTS, whether the CM belongs to the ungrouped CMs.

For description of functions of the modules in this embodiment, all related content of the steps in the foregoing method embodiment can be cited. In addition, hardware implementation of the sending module 310, the processing module 320, and the receiving module 330 in this embodiment is similar to that in the foregoing embodiment, and details are not described herein again.

Figure 4:
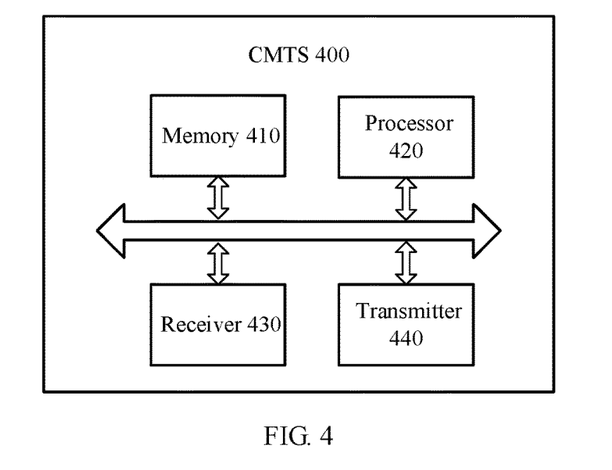
FIG. 4 is a schematic structural diagram of another CMTS according to an embodiment of the present invention.

FIG. 4 is a schematic structural diagram of a CMTS 400 according to another embodiment of the present invention. The CMTS 400 includes a memory 410, a processor 420, a receiver 430, and a transmitter 440.

The memory 410 is configured to store a program.

The processor 420 is configured to execute the program stored in the memory 410.

When the processor 420 executes the program stored in the memory 410, the processor 420 is configured to invoke the transmitter 440 to: send a broadcast message to all CMs connected to the CMTS, where the broadcast message includes information designating one of the CMs to send a probing signal by using a spectrum S in a timeslot T, and the spectrum S is one of overlapping parts between uplink and downlink spectrums; and broadcast a pseudo random binary sequence PRBS by using the spectrum S in a downlink direction in the timeslot T. The processor 420 is further configured to invoke the receiver 430 to receive MER information recorded in the timeslot T by other CMs.

The processor 420 is further configured to calculate a difference between MER information in the timeslot T and MER information in a normal data timeslot, of each of the other CMs.

The other CMs are CMs remaining after the designated CM is removed from all the CMs connected to the CMTS, and the normal data timeslot is a timeslot in which the CMTS sends service data in the downlink direction.

For description of functions of the modules in this embodiment, all related content of the steps in the foregoing method embodiment can be cited, and details are not described herein again.

Another embodiment of the present invention provides another CMTS. The CMTS has a schematic structural diagram the same as that shown in FIG. 4, and includes a memory 410, a processor 420, a receiver 430, and a transmitter 440.

The memory 410 is configured to store a program.

The processor 420 is configured to execute the program stored in the memory 410.

When the processor 420 executes the program stored in the memory 410, the processor 420 is configured to invoke the transmitter 440 to: send a broadcast message to ungrouped CMs, where the broadcast message includes information designating one of the ungrouped CMs to send a probing signal by using a spectrum S' in a timeslot T', and the spectrum S' is one of overlapping parts between uplink and downlink spectrums; and broadcast a pseudo random binary sequence PRBS by using the spectrum S' in a downlink direction in the timeslot T'. The processor 420 is further configured to invoke the receiver 430 to receive MER information recorded in the timeslot T' by other CMs.

The processor 420 is further configured to calculate a difference between MER information in the timeslot T' and MER information in a normal data timeslot, of each of the other CMs.

The other CMs are CMs remaining after the designated CM is removed from the ungrouped CMs, and the normal data timeslot is a timeslot in which the CMTS sends service data in the downlink direction.

The processor 420 is further configured to determine, based on configuration information of each CM, whether the CM belongs to the ungrouped CMs.

For description of functions of the modules in this embodiment, all related content of the steps in the foregoing method embodiment can be cited, and details are not described herein again.

Another embodiment of the present invention provides a cable modem CM. The CM has a schematic structural diagram shown in FIG. 5, and includes a sending module 510, a receiving module 520, and a recording module 530.

Figure 5:
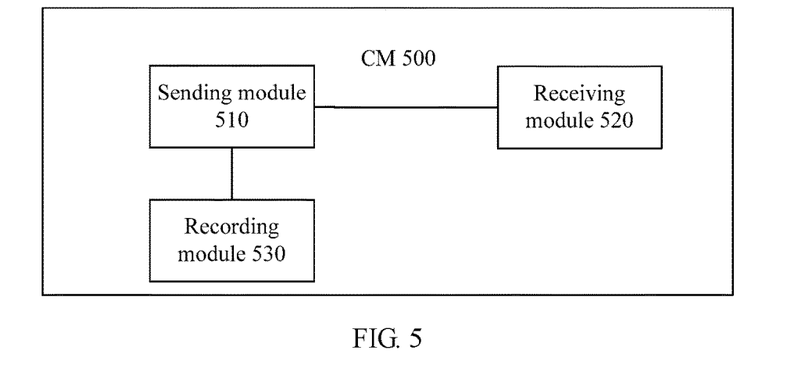
FIG. 5 is a schematic structural diagram of a CM according to an embodiment of the present invention.

The receiving module 520 is configured to receive a broadcast message sent by a CMTS, where the broadcast message includes information designating the CM to send a probing signal by using a spectrum S in a timeslot T, and the spectrum S is one of overlapping parts between uplink and downlink spectrums; and is further configured to receive, by using the designated spectrum S in the designated timeslot T, a pseudo random binary sequence PRBS sent by the CMTS.

The sending module 510 is configured to send a probing signal by using the designated spectrum S in the designated timeslot T based on the broadcast message received by the receiving module 520.

The recording module 530 is configured to: record a local MER when a probing signal is sent by using the designated spectrum S in the designated timeslot T, and record a local MER in a normal data timeslot.

Further, the sending module 510 is further configured to send the MER information recorded by the recording module 530 to the CMTS. Alternatively, the sending module 510 sends a difference between MER information in the timeslot T and MER information in the normal data timeslot to the CMTS.

The recording module 530 may be implemented in terms of hardware by using a combination of a control circuit and a storage circuit. The control circuit may be a processor or a controller, or may be a general-purpose processor, a digital signal processor (DSP), an application-specific integrated circuit (ASIC), a field programmable gate array (FPGA) or another programmable logic device, a transistor logic device, a hardware component, or any combination thereof. The receiving module 520 and the sending module 510 may be a receiving interface part and a sending interface part in a transceiver respectively, or may be a receiving interface part and a sending interface part in a transceiver circuit respectively.

For description of functions of the modules in this embodiment, all related content of the steps in the foregoing method embodiment can be cited, and details are not described herein again.

Another embodiment of the present invention provides another CM. The CM has a schematic structural diagram shown in FIG. 6, and includes a memory 610, a processor 620, a receiver 630, and a transmitter 640.

Figure 6:
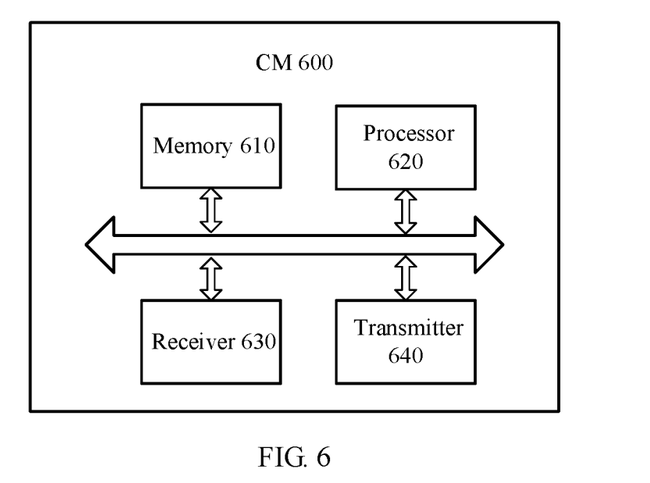
FIG. 6 is a schematic structural diagram of another CM according to an embodiment of the present invention.

The memory 610 is configured to store a program.

The processor 620 is configured to execute the program stored in the memory 610.

When the processor 620 executes the program stored in the memory 610, the processor 620 is configured to invoke the receiver 630 to: receive a broadcast message sent by a CMTS, where the broadcast message includes information designating the CM to send a probing signal by using a spectrum S in a timeslot T, and the spectrum S is one of overlapping parts between uplink and downlink spectrums; and is further configured to receive, by using the designated spectrum S in the designated timeslot T, a pseudo random binary sequence PRBS sent by the CMTS.

The processor 620 is further configured to: invoke the transmitter 640 to send a probing signal by using the spectrum S in the timeslot T; and invoke the memory 610 to record a local MER by using the designated spectrum S in the designated timeslot T, and record a local MER in a normal data timeslot.

The processor 620 is further configured to: calculate a difference between MER information in the timeslot T and MER information in the normal data timeslot, of each of the other CMs; and invoke the transmitter 640 to send the calculated difference to the CMTS. Alternatively, the processor 620 does not directly perform the calculation but sends the recorded MERs to the CMTS, and the CMTS performs the calculation.

For description of functions of the modules in this embodiment, all related content of the steps in the foregoing method embodiment can be cited, and details are not described herein again.

Figure 7:
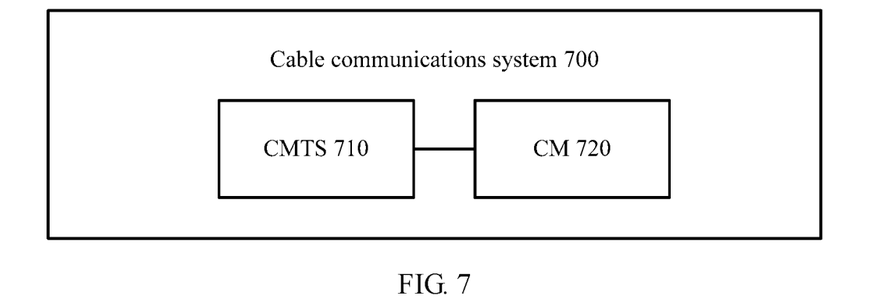
FIG. 7 is a schematic structural diagram of a cable communications system according to an embodiment of the present invention.

FIG. 7 is a schematic structural diagram of a cable communications system 700 according to an embodiment of the present invention. It should be understood that the communications system shown in FIG. 7 is merely an example, and the communications system in this embodiment of the present invention may further include another device or unit, or include modules with functions similar to those of the devices in FIG. 7.

The cable communications system 700 includes a CMTS 710 and a plurality of CMs 720, where the CMTS 710 is the CMTS 300 shown in FIG. 3 or the CMTS 400 shown in FIG. 4, and the CM 720 is the CM 500 shown in FIG. 5. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for measuring interference to a cable modem (CM), the method comprising:
    sending, by a cable modem termination system (CMTS), a broadcast message to all CMs connected to the CMTS, wherein the broadcast message comprises information designating one of the CMs to send a probing signal by using a spectrum S in a timeslot T, and wherein the spectrum S is one of overlapping parts between uplink and downlink spectrums;
    broadcasting, by the CMTS, a pseudo random binary sequence by using the spectrum S in a downlink direction in the timeslot T; and
    obtaining, by the CMTS, modulation error ratio (MER) information recorded in the timeslot T by other CMs, and using a difference between MER information in the timeslot T and MER information in a normal data timeslot, of each of the other CMs, as intensity of interference to the corresponding CM, wherein the other CMs are CMs remaining after the designated CM is removed from all the CMs connected to the CMTS, and wherein the normal data timeslot is a timeslot in which the CMTS sends service data in the downlink direction.

2. The method according to claim 1, wherein the method further comprises sending, by the designated CM, a probing signal by using the designated spectrum S in an uplink direction in the timeslot T.

3. The method according to claim 1, wherein the method further comprises grouping, by the CMTS based on the obtained intensity of interference to each of the other CMs, a CM undergoing interference whose intensity is higher than a threshold and the designated CM into a group.

4. The method according to claim 1, wherein the CMTS further performs classification to obtain an uplink dedicated spectrum and a downlink dedicated spectrum, wherein the downlink dedicated spectrum is used by each CM connected to the CMTS to obtain information about an uplink/downlink physical channel, and wherein the uplink dedicated spectrum is used by each CM to perform ranging or registration.

5. A method for measuring interference to a cable modem (CM), comprising:
    sending, by a cable modem termination system (CMTS), a broadcast message to ungrouped cable modems CMs, wherein the broadcast message comprises information designating one of the ungrouped CMs to send a probing signal by using a spectrum S' in a timeslot T', and wherein the spectrum S' is one of overlapping parts between uplink and downlink spectrums;
    broadcasting, by the CMTS, a pseudo random binary sequence by using the spectrum S' in a downlink direction in the timeslot T'; and
    obtaining, by the CMTS, modulation error ratio (MER) information recorded in the timeslot T' by non-designated CMs in the ungrouped CMs, and using a difference between MER information in the timeslot T' and MER information in a normal data timeslot, of each of the other CMs, as intensity of interference to the corresponding CM, wherein the other CMs are CMs remaining after the designated CM is removed from the ungrouped CMs, and wherein the normal data timeslot is a timeslot in which the CMTS sends service data in the downlink direction.

6. The method according to claim 5, wherein the method further comprises sending, by the designated CM, a probing signal by using the designated spectrum S' in an uplink direction in the timeslot T'.

7. The method according to claim 5, wherein the method further comprises grouping, by the CMTS based on the obtained intensity of interference to each of the other CMs, a CM undergoing interference whose intensity is higher than a threshold and the designated CM into a group.

8. The method according to claim 5, wherein the CMTS determines, based on configuration information of each CM, whether the CM belongs to the ungrouped CMs.

9. A cable modem termination system (CMTS), comprising a receiver, a transmitter, a memory and at least one processor, wherein the at least one processor is coupled to the memory, the receiver, and the transmitter, wherein the memory includes instructions that when executed by the at least one processor cause the CMTS to perform the following:
    sending a broadcast message to ungrouped cable modems (CMs), wherein the broadcast message comprises information designating one of the ungrouped CMs to send a probing signal by using a spectrum S' in a timeslot T', wherein the spectrum S' is one of overlapping parts between uplink and downlink spectrums;
    broadcasting a pseudo random binary sequence by using the spectrum S' in a downlink direction in the timeslot T';
    receiving modulation error ratio (MER) information recorded in the timeslot T' by other CMs; and
    using, based on the MER information recorded in the timeslot T' by the other CMs and obtained by the receiving module, a difference between MER information in the timeslot T' and MER information in a normal data timeslot, of each of the other CMs, as intensity of interference to the corresponding CM, wherein the other CMs are CMs remaining after the designated CM is removed from the ungrouped CMs, and wherein the normal data timeslot is a timeslot in which the CMTS sends service data in the downlink direction.

10. The CMTS according to claim 9, further performing grouping, based on the intensity, obtained by the at least one processor, of interference to each of the other CMs, a CM undergoing interference whose intensity is higher than a threshold and the designated CM into a group.

11. The CMTS according to claim 9, further performing determining, based on configuration information of each CM, whether the CM belongs to the ungrouped CMs.

12. A cable communications system, comprising a cable modem termination system (CMTS) and a plurality of cable modems (CMs), wherein the CMTS comprises a receiver, a transmitter, a memory and at least one processor, wherein the at least one processor is coupled to the memory, the receiver, and the transmitter, wherein the memory includes instructions that when executed by the at least one processor cause the CMTS to perform the following:

sending a broadcast message to ungrouped cable modems (CMs), wherein the broadcast message comprises information designating one of the ungrouped CMs to send a probing signal by using a spectrum S' in a timeslot T', wherein the spectrum S' is one of overlapping parts between uplink and downlink spectrums;

broadcasting a pseudo random binary sequence by using the spectrum S' in a downlink direction in the timeslot T';

receiving modulation error ratio (MER) information recorded in the timeslot T' by other CMs; and using, based on the MER information recorded in the timeslot T' by the other CMs and obtained by the receiving module, a difference between MER information in the timeslot T' and MER information in a normal data timeslot, of each of the other CMs, as intensity of interference to the corresponding CM, wherein the other CMs are CMs remaining after the designated CM is removed from the ungrouped CMs, and wherein the normal data timeslot is a timeslot in which the CMTS sends service data in the downlink direction.

13. The cable communications system of claim 12, wherein the CMTS further performs grouping, based on the intensity, obtained by the at least one processor, of interference to each of the other CMs, a CM undergoing interference whose intensity is higher than a threshold and the designated CM into a group.

14. The cable communications system of claim 12, wherein the CMTS further performs determining, based on configuration information of each CM, whether the CM belongs to the ungrouped CMs.

* * * * *

UNITED STATES PATENT AND TRADEMARK OFFICE
CERTIFICATE OF CORRECTION

PATENT NO. : 10,461,806 B2  
APPLICATION NO. : 16/274943  
DATED : October 29, 2019  
INVENTOR(S) : Li Zhang Page 1 of 1

It is certified that error appears in the above-identified patent and that said Letters Patent is hereby corrected as shown below:

On the Title Page

Column 1, Line 1, in Assignee, delete "Hauwei" and insert -- Huawei --, therefor.

Column 2, Line 1, in Other Publications, delete "v1.11" and insert -- v1.1.1 --, therefor.

Signed and Sealed this  
Fourteenth Day of January, 2020

Andrei Iancu  
*Director of the United States Patent and Trademark Office*